(12) United States Patent
Douglass et al.

(10) Patent No.: US 6,798,239 B2
(45) Date of Patent: Sep. 28, 2004

(54) PROGRAMMABLE GATE ARRAY HAVING INTERCONNECTING LOGIC TO SUPPORT EMBEDDED FIXED LOGIC CIRCUITRY

(75) Inventors: Stephen M. Douglass, Saratoga, CA (US); Steven P. Young, Boulder, CO (US); Nigel G. Herron, San Jose, CA (US); Mehul R. Vashi, San Jose, CA (US); Jane W. Sowards, Fremont, CA (US)

(73) Assignee: Xilinx, Inc., San Jose, CA (US)

(*) Notice: Subject to any disclaimer, the term of this patent is extended or adjusted under 35 U.S.C. 154(b) by 0 days.

(21) Appl. No.: 09/968,446

(22) Filed: Sep. 28, 2001

(65) Prior Publication Data

US 2003/0062922 A1 Apr. 3, 2003

(51) Int. Cl.[7] .............................................. H03K 19/177
(52) U.S. Cl. ............................ 326/39; 326/38; 326/41; 716/16
(58) Field of Search ...................... 326/38–41

(56) References Cited

U.S. PATENT DOCUMENTS

| | | |
|---|---|---|
| 4,758,985 A | 7/1988 | Carter |
| 4,855,669 A | 8/1989 | Mahoney |
| 5,072,418 A | 12/1991 | Boutaud et al. |
| 5,142,625 A | 8/1992 | Nakai |
| RE34,363 E | 8/1993 | Freeman |
| 5,274,570 A | 12/1993 | Izumi et al. |
| 5,311,114 A | 5/1994 | Sambamurthy et al. |
| 5,339,262 A | 8/1994 | Rostoker et al. |
| 5,347,181 A | 9/1994 | Ashby et al. |
| 5,361,373 A | 11/1994 | Gilson |
| 5,457,410 A | 10/1995 | Ting |
| 5,473,267 A | 12/1995 | Stansfield |
| 5,500,943 A | 3/1996 | Ho et al. |
| 5,504,738 A | 4/1996 | Sambamurthy et al. |
| 5,537,601 A | 7/1996 | Kimura et al. |
| 5,543,640 A | 8/1996 | Sutherland et al. |
| 5,550,782 A | 8/1996 | Cliff et al. |
| 5,552,722 A | 9/1996 | Kean |
| 5,574,930 A | 11/1996 | Halverson, Jr. et al. |

(List continued on next page.)

FOREIGN PATENT DOCUMENTS

| | | |
|---|---|---|
| EP | 0315275 A2 | 10/1989 |
| EP | 0 905 906 A2 | 3/1999 |
| EP | 1 235 351 A1 | 8/2002 |
| WO | WO 93 25968 A1 | 12/1993 |

OTHER PUBLICATIONS

Cary D. Snyder and Max Baron; "Xilinx's A–to–Z System Platform"; Cahners Microprocessor; The Insider's Guide to Microprocessor Hardware; Microdesign Resources; Feb. 26, 2001; pp. 1–5.

U.S. patent application Ser. No. 09/861,112, Dao et al., filed May 18, 2001.

(List continued on next page.)

Primary Examiner—Vibol Tan
(74) Attorney, Agent, or Firm—Timothy W. Markison; H. C. Chan; Justin Liu

(57) ABSTRACT

Interconnecting logic provides connectivity of an embedded fixed logic circuit, or circuits, with programmable logic fabric of a programmable gate array such that the fixed logic circuit functions as an extension of the programmable logic fabric. The interconnecting logic includes interconnecting tiles and may further include interfacing logic. The interconnecting tiles provide selective connectivity between inputs and/or outputs of the fixed logic circuit and the interconnects of the programmable logic fabric. The interfacing logic, when included, provides logic circuitry that conditions data transfers between the fixed logic circuit and the programmable logic fabric.

17 Claims, 11 Drawing Sheets

U.S. PATENT DOCUMENTS

| | | | |
|---|---|---|---|
| 5,574,942 A | 11/1996 | Colwell et al. | |
| 5,581,745 A | 12/1996 | Muraoka | |
| 5,600,845 A | 2/1997 | Gilson | |
| 5,652,904 A | 7/1997 | Trimberger | |
| 5,671,355 A | 9/1997 | Collins | |
| 5,705,938 A | 1/1998 | Kean | |
| 5,732,250 A | 3/1998 | Bates et al. | |
| 5,737,631 A | 4/1998 | Trimberger | |
| 5,740,404 A | 4/1998 | Baji | |
| 5,742,179 A * | 4/1998 | Sasaki | 326/39 |
| 5,742,180 A | 4/1998 | DeHon et al. | |
| 5,748,979 A | 5/1998 | Trimberger | |
| 5,752,035 A | 5/1998 | Trimberger | |
| 5,760,607 A * | 6/1998 | Leeds et al. | 326/38 |
| 5,809,517 A | 9/1998 | Shimura | |
| 5,825,202 A | 10/1998 | Tavana et al. | |
| 5,835,405 A | 11/1998 | Tsui et al. | |
| 5,874,834 A * | 2/1999 | New | 326/39 |
| 5,889,788 A | 3/1999 | Pressly et al. | |
| 5,892,961 A | 4/1999 | Trimberger | |
| 5,914,616 A | 6/1999 | Young et al. | |
| 5,914,902 A | 6/1999 | Lawrence et al. | |
| 5,933,023 A | 8/1999 | Young | |
| 5,970,254 A | 10/1999 | Cooke et al. | |
| 6,011,407 A | 1/2000 | New | |
| 6,020,755 A | 2/2000 | Andrews et al. | |
| 6,026,481 A | 2/2000 | New et al. | |
| 6,096,091 A | 8/2000 | Hartmann | |
| 6,154,051 A | 11/2000 | Nguyen et al. | |
| 6,163,166 A * | 12/2000 | Bielby et al. | 326/38 |
| 6,172,990 B1 | 1/2001 | Deb et al. | |
| 6,178,541 B1 | 1/2001 | Joly et al. | |
| 6,181,163 B1 | 1/2001 | Agrawal et al. | |
| 6,184,712 B1 | 2/2001 | Wittig et al. | |
| 6,204,689 B1 | 3/2001 | Percey et al. | |
| 6,211,697 B1 * | 4/2001 | Lien et al. | 326/41 |
| 6,242,945 B1 | 6/2001 | New | |
| 6,272,451 B1 | 8/2001 | Mason et al. | |
| 6,279,045 B1 | 8/2001 | Muthujumaraswathy et al. | |
| 6,282,627 B1 | 8/2001 | Wong et al. | |
| 6,301,696 B1 | 10/2001 | Lien et al. | |
| 6,343,207 B1 | 1/2002 | Hessel et al. | |
| 6,353,331 B1 | 3/2002 | Shimanek | |
| 6,356,987 B1 | 3/2002 | Aulas | |
| 6,389,558 B1 | 5/2002 | Herrmann et al. | |
| 6,434,735 B1 | 8/2002 | Watkins | |
| 6,460,172 B1 | 10/2002 | Insenser Farre et al. | |
| 6,467,009 B1 | 10/2002 | Winegarden et al. | |
| 6,507,942 B1 | 1/2003 | Calderone et al. | |
| 6,510,548 B1 | 1/2003 | Squires | |
| 6,518,787 B1 | 2/2003 | Allegrucci et al. | |
| 6,519,753 B1 | 2/2003 | Ang | |
| 6,522,167 B1 | 2/2003 | Ansari et al. | |
| 6,532,572 B1 | 3/2003 | Tetelbaum | |
| 6,539,508 B1 | 3/2003 | Patrie et al. | |
| 6,541,991 B1 | 4/2003 | Horncheek et al. | |
| 6,587,995 B1 | 7/2003 | Duboc et al. | |
| 6,588,006 B1 | 7/2003 | Watkins | |
| 6,601,227 B1 | 7/2003 | Trimberger | |
| 6,604,228 B1 | 8/2003 | Patel et al. | |
| 6,611,951 B1 | 8/2003 | Tetelbaum et al. | |
| 2001/0049813 A1 | 12/2001 | Chun et al. | |
| 2003/0062922 A1 | 4/2003 | Donblass et al. | |

OTHER PUBLICATIONS

U.S. patent application Ser. No. 09/858,732, Schulz, filed May 15, 2001.

Xilinx, Inc., "The Programmable Logic Data Book," 2000, Ch 3, pp 3–7 to 3–17;3–76 to 3–87, Xilinx, Inc., 2100 Logic Drive, San Jose, CA. 95124.

International Business Machines, "Processor Local Bus" Architecture Specifications, 32–Bit Implementation, Apr. 2000, First Edition, V2.9, pp. 1–76, IBM Corporation, Department H83A, P.O. Box 12195, Research Triangle Park, NC 27709.

Xilinx, Inc., Virtex II Platform FPGA Handbook, Dec. 6, 2000, v1.1, pp 33–75, Xilinx, Inc., 2100 Logic Drive, San Jose, CA. 95124.

U.S. patent application Ser. No. 09/991,410, Herron et al., filed Nov. 16, 2001.

Sayfe Kiaei et al., "VLSI Design of Dynamically Reconfigurable Array Processor–DRAP," IEEE, Feb. 1989, pp. 2484–2488, V3.6, IEEE, 3 Park Avenue, 17th Floor, New York, NY 10016–5997.

Vason P. Srini, "Field Programmable Gate Array (FPGA) Implementation of Digital Systems: An Alternative to ASIC," IEEE, May 1991, pp. 309–314, IEEE, 3 Park Avenue, 17th Floor, New York, NY 10016–5997.

G. Maki et al., "A Reconfigurable Data Path Processor," IEEE, Aug. 1991, pp. 18–4.1 to 18–4.4, IEEE, 3 Park Avenue, 17th Floor, New York, NY 10016–5997.

Jacob Davidson, "FPGA Implementation of Reconfigurable Microprocessor," IEEE, Mar. 1993, pp. 3.2.1–3.2.4, IEEE, 3 Park Avenue, 17th Floor, New York, NY 10016–5997.

Christian Iseli et al., "Beyond Superscaler Using FPGA's," IEEE, Apr. 1993, pp. 486–490, IEEE, 3 Park Avenue, 17th Floor, New York, NY 10016–5997.

Christian Iseli et al., "Spyder: A Reconfigurable VLIW Processor Using FPGA's," IEEE, Jul. 1993, pp. 17–24, IEEE, 3 Park Avenue, 17th Floor, New York, NY 10016–5997.

Michael I. Wirthlin et al., "The Nano Processor: A Low Resource Reconfigurable Processor," IEEE, Feb. 1994, pp. 23–30, IEEE, 3 Park Avenue, 17th Floor, New York, NY 10016–5997.

William S. Carter, "The Future of Programmable Logic and Its Impact on Digital System Design," Apr. 1994, IEEE, pp. 10–16, IEEE, 3 Park Avenue, 17th Floor, New York, NY 10016–5997.

André Dehon, "DPGA–Coupled Microprocessors: Commodity ICs for the Early 21st Century,"IEEE, Feb. 1994, pp. 31–39, IEEE, 3 Park Avenue, 17th Floor, New York, NY 10016–5997.

Osama T. Albaharna, "Area & Time Limitations of FPGA–Based Virtual Hardware," IEEE, Apr. 1994, pp. 184–189, IEEE, 3 Park Avenue, 17th Floor, New York, NY 10016–5997.

U.S. patent application Ser. No. 09/917,304, Douglass et al., filed Jul. 27, 2001.

Xilinx, Inc., "The Programmable Logic Data Book," 1994, Revised 1995, Xilinx, Inc., 2100 Logic Drive, San Jose, CA. 95124.

Xilinx, Inc., "The Programmable Logic Data Book," 1994, Revised 1995, pp 2–109 to 2–117, Xilinx, Inc., 2100 Logic Drive, San Jose, CA. 95124.

Xilinx, Inc., "The Programmable Logic Data Book," 1994, Revised 1995, pp 2–9 to 2–18; 2–187 to 2–199, Xilinx, Inc., 2100 Logic Drive, San Jose, CA. 95124.

Xilinx, Inc., "The Programmable Logic Data Book,"1994, Revised 1995, pp 2–107 to 2–108, Xilinx, Inc., 2100 Logic Drive, San Jose, CA. 95124.

Christian Iseli et al., "AC++ Compiler for FPGA Custom Execution Units Synthesis," 1995, pp. 173–179, IEEE, 3 Park Avenue, 17th Floor, New York, NY 10016–5997.

*International Business Machines,* "PowerPC 405 Embedded Processor Core User Manual," 1996, 5th Ed., pp. 1-1 to X–16, International Business Machines, 1580 Rout 52, Bldg. 504, Hopewell Junction, NY 12533–6531.

Yamin Li et al., "AIZUP—A Pipelined Processor Design & Implementation on Xilinx FPGA Chip," IEEE, Sep. 1996, pp 98–106, IEEE, 3 Park Avenue, 17th Floor, New York, NY 10016–5997.

Ralph D. Wittig et al., Onechip: An FPGA Processor with Reconfigurable Logic, Apr. 17, 1996, pp 126–135, IEEE, 3 Park Avenue, 17th Floor, New York, NY 10016–5997.

*Xilinx, Inc.,* "The Programmable Logic Data Book," Jan. 27, 1999, Ch. 3, pp 3–1 to 3–50, Xilinx, Inc., 2100 Logic Drive, San Jose, CA. 95124.

William B. Andrew et al., "A Field Programmable System Chip Which Combines FPGA & ASIC Circuitry," IEEE, May 16, 1999, pp. 183–186, IEEE, 3 Park Avenue, 17th Floor, New York, NY 10016–5997.

*Xilinx, Inc.,* "The Programmable Logic Data Book," 2000, Ch. 3 pp 3–1 TO 3–117, Xilinx, Inc., 2100 Logic Drive, San Jose, CA. 95124.

* cited by examiner

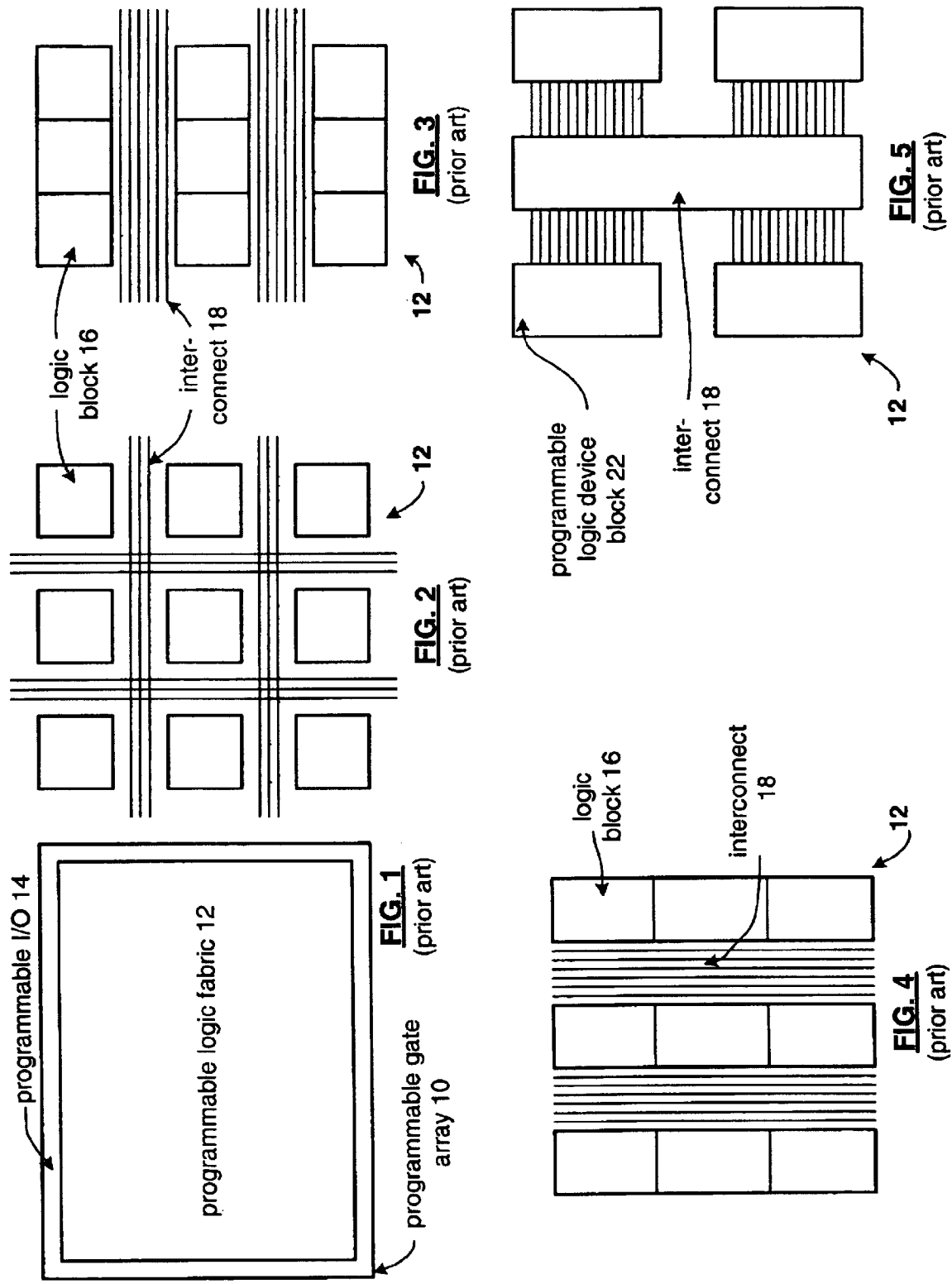

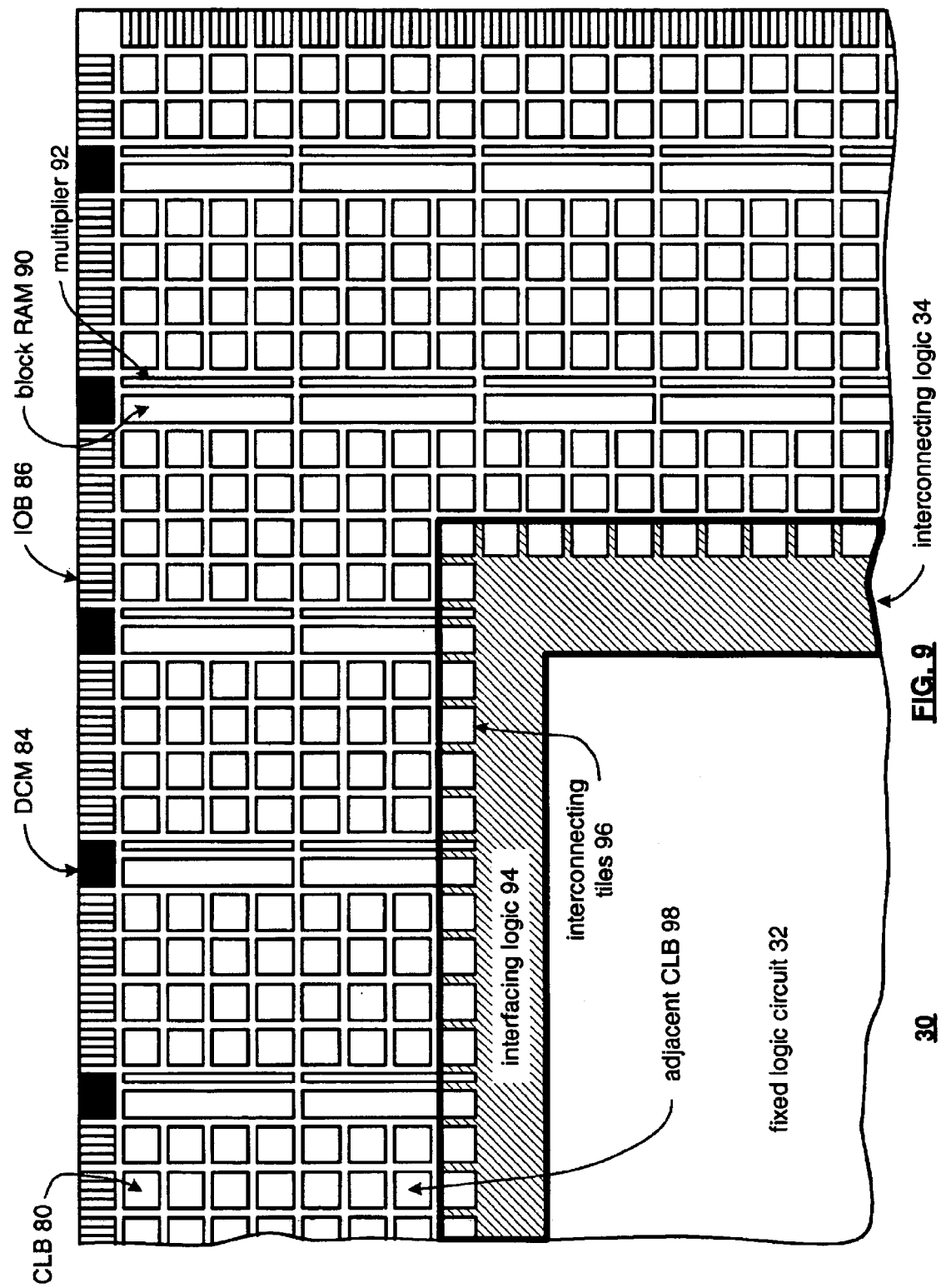

PROGRAMMABLE GATE ARRAY HAVING INTERCONNECTING LOGIC TO SUPPORT EMBEDDED FIXED LOGIC CIRCUITRY

TECHNICAL FIELD OF THE INVENTION

This invention relates generally to programmable gate arrays and in particular to embedding fixed logic circuits within such programmable gate arrays.

BACKGROUND OF THE INVENTION

Programmable devices are a class of general-purpose integrated circuits that can be configured for a wide variety of applications. Such programmable devices have two basic versions, mask programmable devices, which are programmed only by a manufacture, and field programmable devices, which are programmable by the end user. In addition, programmable devices can be further categorized as programmable memory devices or programmable logic devices. Programmable memory devices include programmable read only memory (PROM), erasable programmable read only memory (EPROM) and electronically erasable programmable read only memory (EEPROM). Programmable logic devices include programmable logic array (PLA) devices, programmable array logic (PAL) devices, erasable programmable logic devices (EPLD) devices, and programmable gate arrays (PGA).

Field programmable gate arrays (FPGA) have become very popular for telecommunication applications, Internet applications, switching applications, routing applications, and a variety of other end user applications. FIG. 1 illustrates a generic schematic block diagram of a field programmable gate array (FPGA) 10. The FPGA 10 includes programmable logic fabric 12 (containing programmable logic gates and programmable interconnects) and programmable input/output blocks 14. The programmable input/output blocks 14 are fabricated on a substrate supporting the FPGA 10 and are coupled to the pins of the integrated circuit, allowing users to access the programmable logic fabric 12. The programmable logic fabric 12 may be programmed to perform a wide variety of functions corresponding to particular end user applications. The programmable logic fabric 12 may be implemented in a variety of ways. For example, the programmable logic fabric 12 may be implemented in a symmetric array configuration, a row-based configuration, a column-based configuration, a sea-of-gates configuration, or a hierarchical programmable logic device configuration.

FIG. 2 illustrates the programmable logic fabric 12 implemented in accordance with a symmetrical array configuration. As shown, a plurality of logic blocks 16 is configured as an array of rows and columns. Each of the plurality of logic blocks 16 may be programmed by the end user to perform a specific logic function. More complex logic functions may be obtained by interconnecting individually programmed logic blocks using a plurality of programmable interconnections 18. Accordingly, between each of the logic blocks of each row and each column are programmable interconnections 18.

The programmable interconnections 18 provide the selective connectivity between the logic blocks of the array of logic blocks 16 as well as between the logic blocks and the programmable input/output blocks 14. The programmable interconnections 18 may be implemented using any programmable element, including static RAM cell technology, fuse and/or anti-fuse cell technologies, EPROM transistor technology, and/or EEPROM transistor technology. If the FPGA utilizes static RAM programmable connections, the connections can be made using a variety of components, including pass transistors, transmission gates, and/or multiplexors that are controlled by the static RAM cells. If the FPGA utilizes anti-fuse interconnections, the interconnections typically reside in a high impedance state and can be reprogrammed into a low impedance, or fused, state to provide the selective connectivity. If the FPGA utilizes EPROM or EEPROM based interconnections, the interconnection cells may be reprogrammed, thus allowing the FPGA to be reconfigured.

FIG. 3 illustrates a schematic block diagram of the programmable logic fabric 12 being implemented as a row based configuration. In this configuration, the programmable logic fabric 12 includes a plurality of logic blocks 16 arranged in rows. Between each row of the logic blocks are programmable interconnections 18. The interconnections may be implementing utilizing any programmable storage elements, including RAMs (static, dynamic and NVRAM), fuse and/or anti-fuse technologies, EPROM technology, and/or EEPROM technology.

FIG. 4 illustrates a schematic block diagram of the programmable logic fabric 12 being implemented as a column-based configuration. Logic blocks 16 and programmable interconnections 18 in FIGS. 3 and 4 are substantially similar.

FIG. 5 illustrates the programmable logic fabric 12 being implemented as a hierarchical programmable logic device. In this implementation, the programmable logic fabric 12 includes programmable logic device blocks 22 and programmable interconnections 18. As shown, four programmable logic block devices 22 are in the corners with an interconnection block 18 in the middle of the logic device blocks. In addition, the interconnections include lines coupling the programmable logic device blocks 22 to the interconnection block 18.

As is known, field programmable gate arrays allow end users the flexibility of implementing custom integrated circuits while avoiding the initial cost, time delay and inherent risk of application specific integrated circuits (ASIC). While FPGAs have these advantages, there are some disadvantages. For instance, an FPGA programmed to perform a similar function as implemented in an ASIC can require more die area than the ASIC. Further, the performance of a design using a FPGA may in some cases be lower than that of a design implemented using an ASIC.

One way to mitigate these disadvantages is to embed into an FPGA certain commonly used complex functions as fixed logic circuits. Therefore, a need exists for a programmable gate array that includes embedded fixed logic circuits yet retains programmable components.

BRIEF DESCRIPTION OF THE DRAWINGS

FIG. 1 illustrates a schematic block diagram of a prior art field programmable gate array;

FIG. 2 illustrates a schematic block diagram of the programmable logic fabric of the programmable gate array of FIG. 1 being implemented in a symmetrical array configuration;

FIG. 3 illustrates a schematic block diagram of the programmable logic fabric of the programmable gate array of FIG. 1 being implemented as a row based configuration;

FIG. 4 illustrates a schematic block diagram of a programmable logic fabric of the programmable gate array of FIG. 1 being implemented as a column based configuration;

FIG. 5 illustrates a schematic block diagram of the programmable logic fabric of the programmable gate array of FIG. 1 being implemented as a hierarchical programmable logic device configuration;

FIG. 9 illustrates a more detailed graphical diagram of the programmable gate array of FIG. 3;

DETAILED DISCUSSION OF A PREFERRED EMBODIMENT

Generally, the present invention provides interconnecting logic that interfaces an embedded fixed logic circuit, or circuits, with programmable logic fabric of a programmable gate array. The interconnecting logic enables any fixed logic circuit (e.g., a digital signal processor, microprocessor, physical layer interface, link layer interface, network layer interface, audio processor, video graphics processor, and/or applications specific integrated circuit) to be embedded within the programmable logic fabric of a programmable gate array. In addition, the interconnecting logic provides connectivity between the fixed logic circuit and the programmable logic fabric such that the fixed logic circuit can be connected to any other blocks in the programmable logic fabric.

The interconnecting logic includes interconnecting tiles and may further include interfacing logic. The interconnecting tiles provide programmable connectivity between inputs and/or outputs of the fixed logic circuit and the interconnects of the programmable logic fabric. The interfacing logic, when included, conditions signals between the fixed logic circuit and the programmable logic fabric. The signal conditioning can include data format changes, parallel-to-serial conversion, serial-to-parallel conversion, multiplexing, demultiplexing, performing logic functions and/or control signal generation, etc. With such interconnecting logic, any fixed logic circuit may be readily embedded within a programmable gate array to provide additional functionality to the end users of FPGAs.

Figure 6:
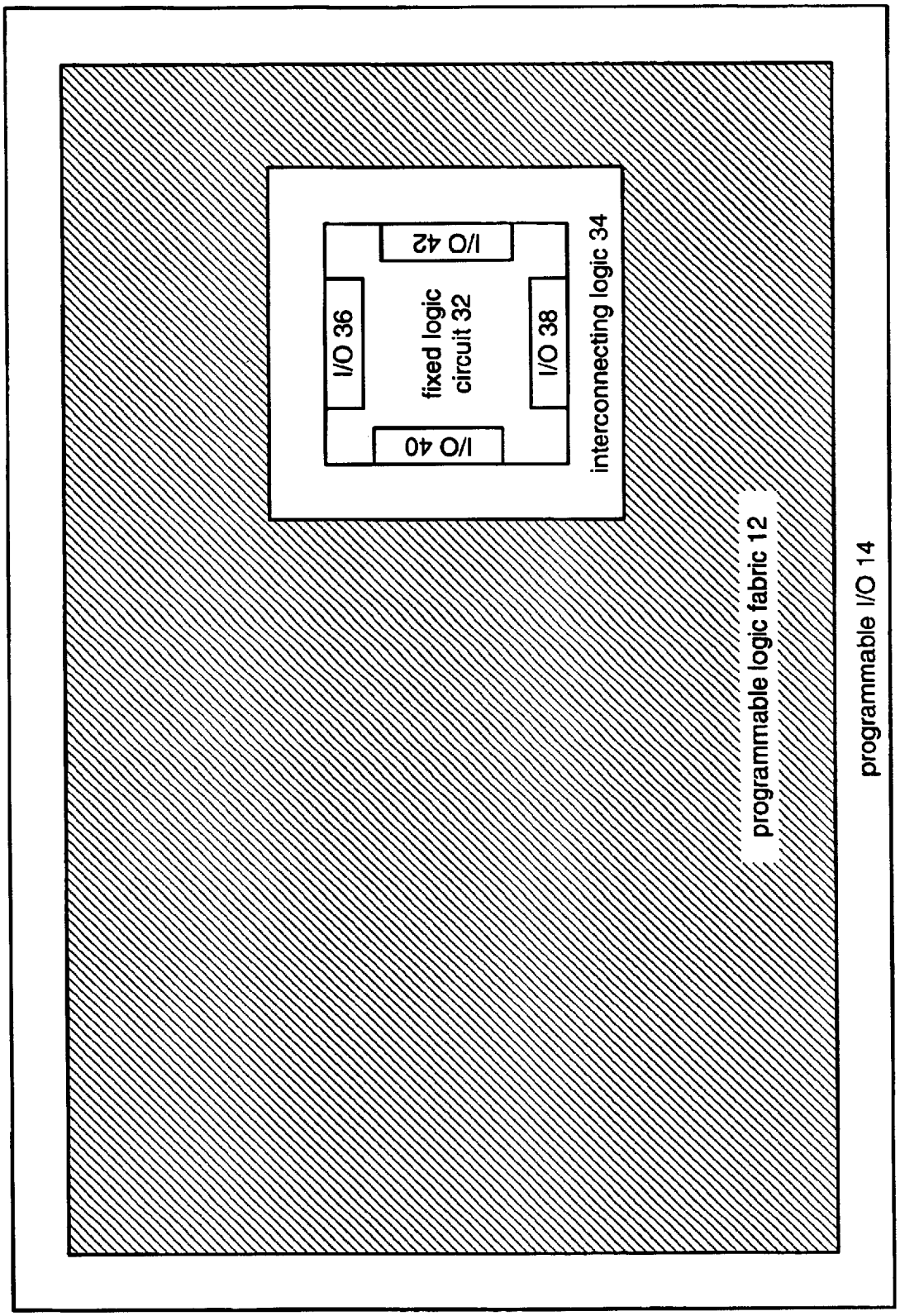
FIG. 6 illustrates a graphical diagram of a programmable gate array in accordance with the present invention.

The present invention can be more fully described with reference to FIGS. 6 through 18. FIG. 6 illustrates a block diagram of a programmable gate array 30. The programmable gate array may be a field programmable gate array or a mask programmable gate array. In addition, the programmable gate array may include programmable logic device functionality, programmable array logic functionality, programmable logic arrays, et cetera. The programmable gate array 30 includes the programmable logic fabric 12, the programmable input/output blocks 14, interconnecting logic 34, and a fixed logic circuit 32.

The fixed logic circuit 32, which may include any logic function, such as a digital signal processor, microprocessor, physical layer interface, link layer interface, network layer interface, network processor, audio processor, video graphics processor, logic circuitry, and/or application specific integrated circuits, includes at least one input and at least one output. Typically, the fixed logic circuit 32 includes a plurality of inputs and a plurality of outputs, which are represented by input/output ports 36, 38, 40 and 42. The input/output ports 36–42 are operably coupled to the interconnecting logic 34, which provides connectivity between the input/output ports of the fixed logic circuit 32 and the programmable logic fabric 12 of the programmable gate array 30, as well as between the various logic functions in the interconnecting logic. It should be noted that more than one fixed logic circuit can be included in the programmable gate array 30.

The programmable logic fabric 12 includes a plurality of configurable logic blocks (CLB's) and programmable interconnects. The architecture of the programmable logic fabric may be row or column based, hierarchical-PLD, symmetrical array, and/or a sea of gates. The configurable logic blocks may be of the type found in the XC4000E family of FPGAs, Virtex and/or the Virtex-II FPGAs manufactured and distributed by xilinx, Inc. The interconnects may include a plurality of programmable switch matrices that utilize static RAM cell technology, fuse and/or anti-fuse cell technologies, EPROM transistor technology, EEPROM transistor technology and/or any other programmable technology. The switch matrices may be of the type found in the XC4000E family of FPGAs, Virtex and/or the Virtex-II FPGAs manufactured and distributed by Xilinx, Inc. The programmable I/O blocks 14 may be of the type found in the XC4000E family of FPGAs, Virtex and/or the Virtex-II FPGAs designed and manufactured by Xilinx, Inc.

The programmable gate array 30 may be implemented as an integrated circuit. In one embodiment, the circuitry of each of these elements 12, 14, 32 and 34, are implemented using CMOS technology on a silicon substrate. However, as one of average skill in the art will appreciate, other integrated circuit technologies and substrate compositions may be used.

In operation, the interconnecting logic 34 provides coupling between the programmable logic fabric 12 and the fixed logic circuit 32. As such, end users of the programmable gate array 30 may program the PGA 30 treating the fixed logic circuit 32 as a component of the programmable logic fabric 12. For example, if the fixed logic circuit 32 is a microprocessor, the interconnecting logic 34 might include memory for storing programming instructions and/or data for the microprocessor and may further include logic functions (e.g., memory controller) to interface with other blocks of the PGA 30. Accordingly, the programmable logic fabric 12 is programmed to perform desired functions in combination with the fixed logic functions of the microprocessor. Thus, with an embedded microprocessor, the programmable gate array 30 offers the flexibility of a FPGA with the processing efficiency of a custom designed microprocessor. In addition, by embedding a microprocessor within the programmable logic fabric, as opposed to having two separate integrated circuits (one for the microprocessor and another for the FPGA), power consumption is reduced and performance increased due to the elimination of interconnecting pins and traces between the two separate integrated circuits. Other advantages include easier implementation of multi-processor designs and support for a wider range of system level designs (e.g., processor systems with no external memory). Further, the programmable gate array 30 requires less printed circuit board real estate than separate integrated circuits for an FPGA and a microprocessor.

Figure 7:
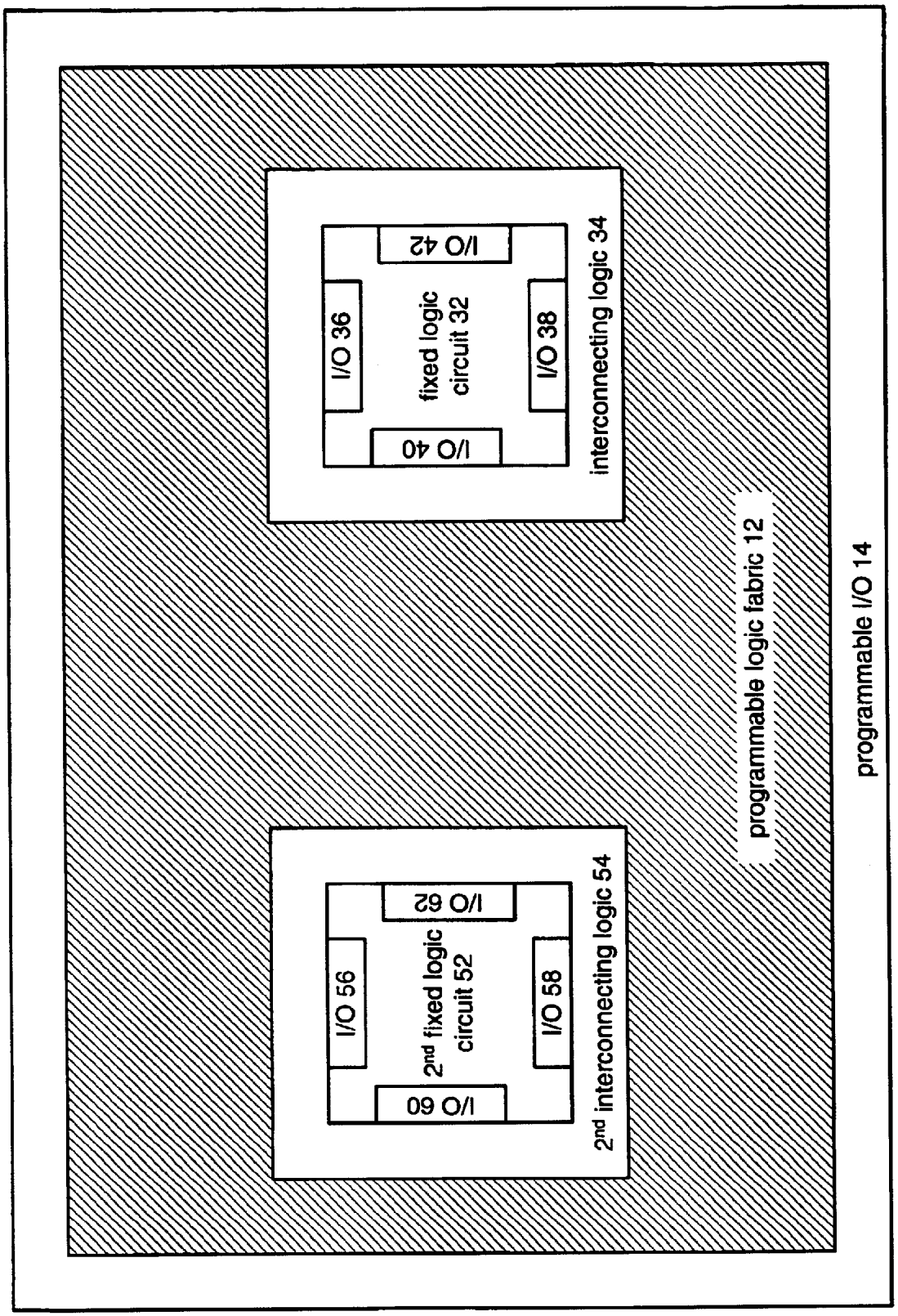
FIG. 7 illustrates a graphical diagram of an alternate programmable gate array in accordance with the present invention.

FIG. 7 illustrates a graphical diagram of an alternate programmable gate array 50. The programmable gate array 50 includes the programmable logic fabric 12, the programmable input/output blocks 14, a $1^{st}$ fixed logic circuit 32, $1^{st}$ interconnecting logic 34, a $2^{nd}$ fixed logic circuit 52 and $2^{nd}$ interconnecting logic 54. In this illustration, the interconnecting logic 34 and fixed logic circuit 32 are as generally described with reference to FIG. 6.

The $2^{nd}$ fixed logic circuit 52 may include any logic functions, such as a digital signal processor, microprocessor, physical layer interface, link layer interface, network layer interface, audio processor, video graphics processor, logic circuitry, and/or an application specific integrated circuit. The $2^{nd}$ fixed logic circuit 52 includes a plurality of input/output ports 56, 58, 60 and 62 that allow it to interface with the $2^{nd}$ interconnecting logic 54. The $2^{nd}$ interconnecting logic 54 provides the connectivity between the $2^{nd}$ fixed logic circuit 52 and the programmable logic fabric 12.

Figure 8:
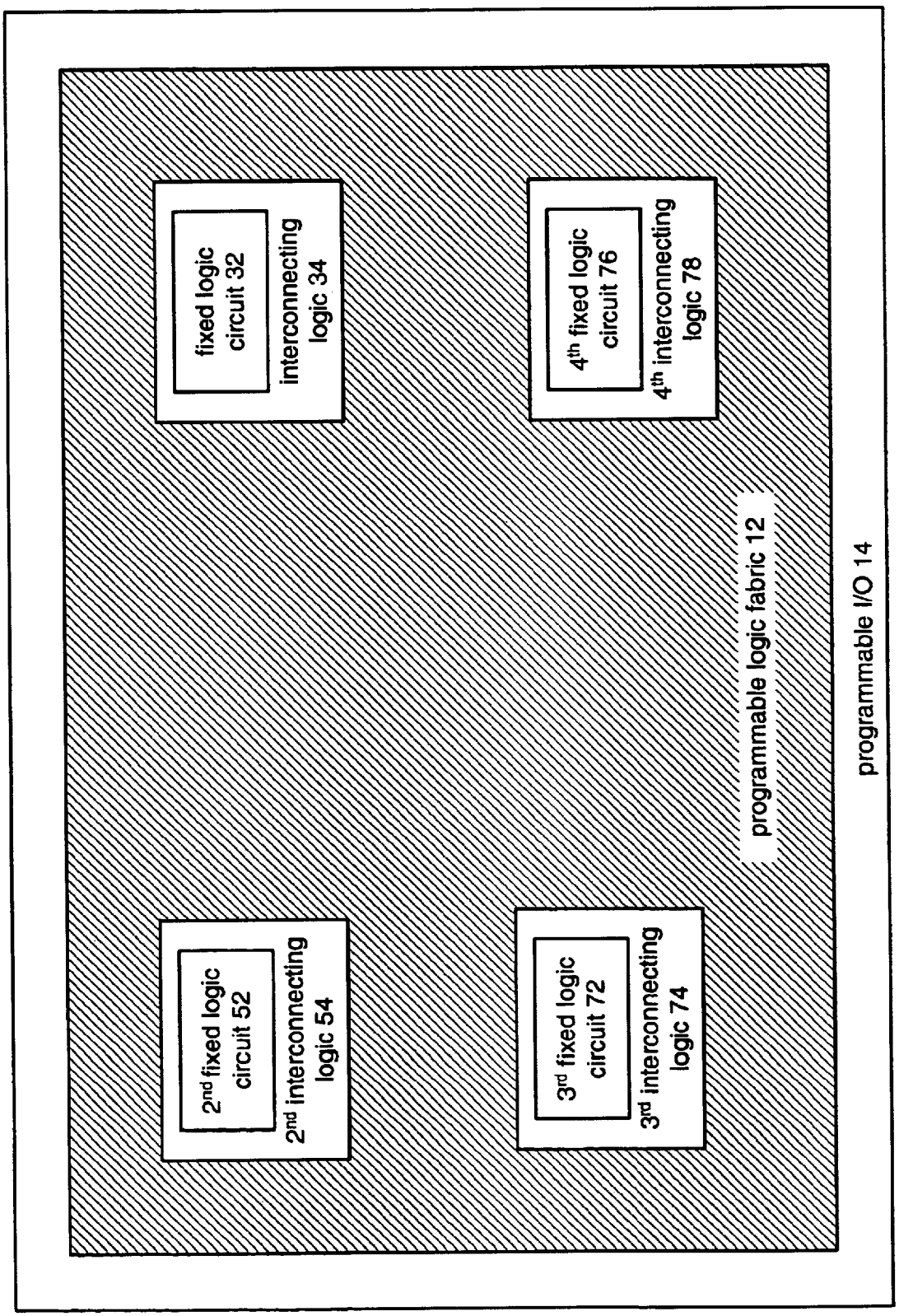
FIG. 8 illustrates a graphical diagram of another programmable gate array in accordance with the present invention.

FIG. 8 illustrates a graphical diagram of another programmable gate array 70. The programmable gate array 70 includes the programmable logic fabric 12, the programmable input/output blocks 14, and four fixed logic circuits 32, 52, 72 and 76. The structure of each fixed logic circuit is similar to the fixed logic circuit shown in FIG. 7 (note that the I/Os in each fixed logic circuit are not shown because of the limited size of the drawings). Each fixed logic circuit 32, 52, 72 and 76 has its own corresponding interconnecting logic 34, 54, 74 and 78, respectively. The interconnecting logic 34, 54, 74 and 78 provide its respective fixed logic circuit connectivity to the programmable logic fabric 12.

The construct of interconnecting logic 34, 54, 74 and 78 will be dependent upon the type of fixed logic circuit it is supporting. For instance, if the fixed logic circuit is a simple fixed logic function, such as a state machine or a combinational logic circuit to perform a particular logic function, the interconnecting logic 34, 54, 74 and/or 78 would include interconnecting tiles. The interconnecting tiles will be described in greater detail with reference to FIGS. 9 through 11. If, however, the fixed logic circuit is more complex, such as a digital signal processor, microprocessor, physical layer interface, link layer interface, network layer interface, audio processor, video graphics processor, network processor, and/or applications specific integrated circuit, the interconnecting logic 34, 54, 74 and/or 78 may include a plurality of interconnecting tiles and (optionally) interfacing logic. The interfacing logic will be described in greater detail with reference to FIGS. 9 and 10.

FIG. 9 illustrates a more detailed graphical diagram of a portion of the programmable gate array 30 of FIG. 6. While FIG. 9 is illustrated with reference to the PGA 30 of FIG. 6, the concepts regarding the interconnecting logic 34 are equally applicable to the interconnecting logic 54 of FIG. 7, and the interconnecting logic 54, 74, and 78 of FIG. 8. As one of average skill in the art will appreciate, any number of fixed logic circuits may be embedded within the programmable logic fabric using interconnecting logic.

As shown in FIG. 9, the programmable logic fabric 12 includes a plurality of configurable logic blocks (CLB) 80, a plurality of memory blocks (Block RAM) 90, and a plurality of multipliers 92. The programmable I/O block section 14 includes a plurality of individual I/O blocks (IOB) 86 and a plurality of digital clock managers (DCM) 84. The operations of the configurable logic blocks 80, the digital clock managers 84, the input/output blocks 86, the block RAM 90, and the multipliers 92 function in a similar manner as corresponding components found in the XC4000E family of field programmable gate arrays, Virtex and/or the Virtex-II field programmable gate arrays designed and manufactured by Xilinx, Inc.

As shown, the configurable logic blocks 80, the block RAM 90 and the multipliers 92 are arranged in a series of rows and columns. The fixed logic circuit 32 displaces some of the components in programmable logic fabric 12 while at the same time is able to integrate with the remaining components in the programmable logic fabric. With some of the programmable logic fabric displaced, regular operation of the FPGA would be interrupted. This interruption occurs as a result of discontinuity of connectivity between the plurality of configurable logic blocks 80, the block RAMs 90, and multipliers 92. One aspect of the present invention is an architecture that allows for full integration of the fixed logic circuit 32 into the programmable logic fabric 12 without discontinuity of connectivity.

In the FPGA 30, each CLB 80, IOB 86, block RAM 90, and multiplier 92 is associated with at least one of the plurality of programmable switch matrices. The plurality of programmable switch matrices provides selective connectivity throughout the programmable logic fabric.

With the insertion of the fixed logic circuit 32 and interconnecting logic 34, the connectivity pattern of the programmable logic fabric is interrupted. The present invention uses a plurality of interconnecting tiles 96 to provide programmable connectivity between (a) the interfacing logic 94, when included, and the fixed logic circuit 32 and (b) the plurality of CLBs 80, block RAM's 90 and/or multipliers 92 of the programmable logic fabric 12. The interconnecting tiles 96 will be discussed in greater detail with reference to FIG. 11.

The interfacing logic 94 conditions signal transfers between the fixed logic 32 and the CLBs 80, block RAM 90 and/or multipliers 92 of the programmable logic fabric 12. Such conditioning is dependent upon the functionality of the fixed logic circuit 32. For example, if the fixed logic circuit 32 processes video and/or audio signals in the analog domain, the interfacing logic 94 could include analog to digital converters and digital to analog converters. If the fixed logic circuit 32 is a microprocessor, the interfacing logic generates and conditions the signals for interfacing the FPGA with the microprocessor (e.g., address buses, data buses and/or control signals of the microprocessor, and FPGA control signals for various modes of operations, such as power-up and configuration). The interfacing logic 94 may include test circuitry for testing the embedded fixed logic circuit and the surrounding programmable logic fabric. In addition, hard peripherals of the microprocessor may also be included in the interfacing logic.

Figure 10A:
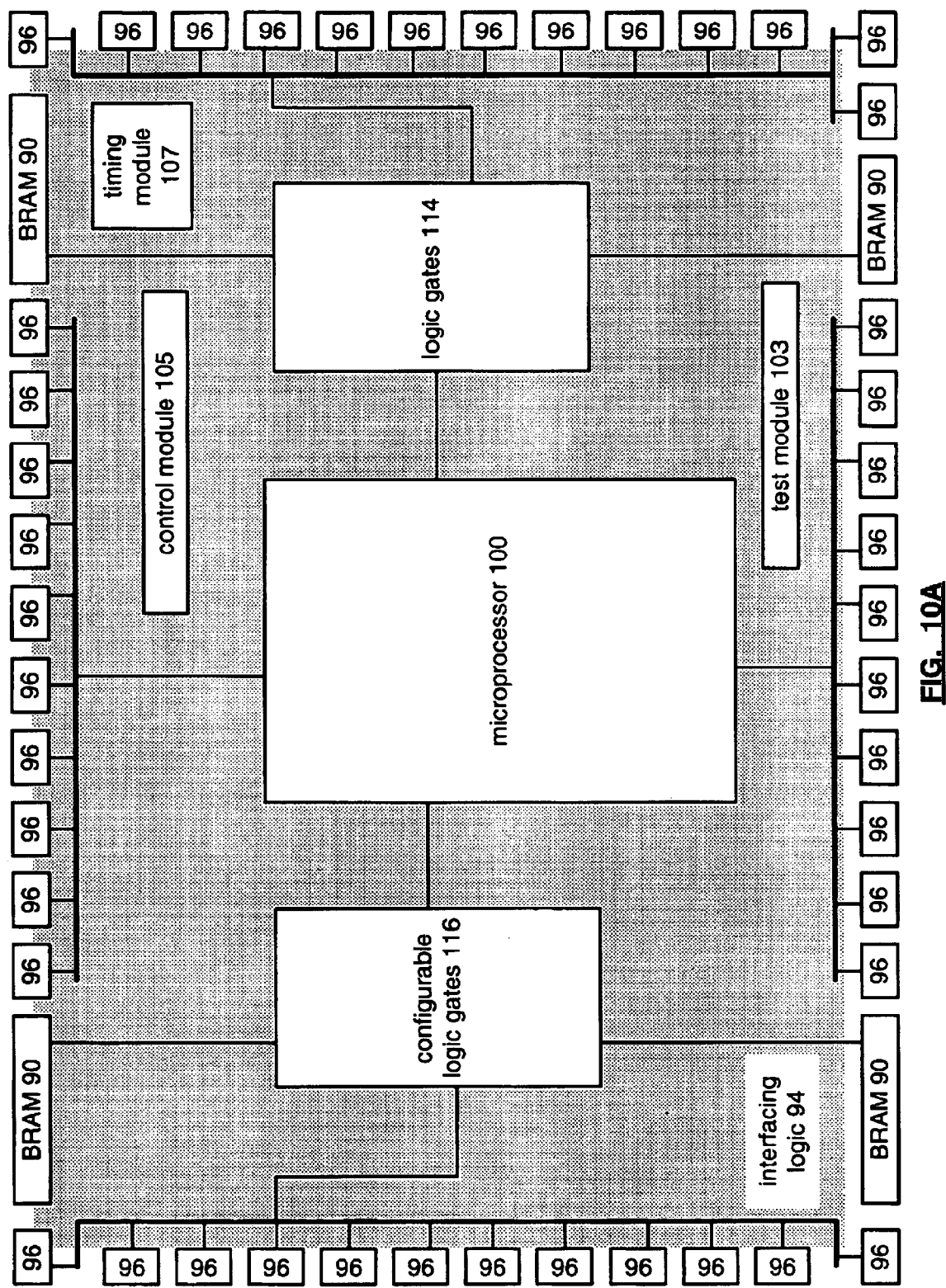
FIG. 10A illustrates a schematic block diagram of the interconnecting tiles and interfacing logic in accordance with the present invention.

FIG. 10A illustrates a schematic block diagram of a microprocessor 100 being embedded in the FPGA 30 as an example of a fixed logic circuit. It should be noted that the present invention is applicable to processors of any design, and is not limited to a particular type of processor. As one of average skill in the art will appreciate, the physical design of the microprocessor 100 can have a variety of geometric configurations. The microprocessor 100 is surrounded by the interconnecting logic 34 (shown in FIG. 9) that includes the interfacing logic 94 and a plurality of interconnecting tiles 96. The microprocessor 100 may be connected to block RAMs 96 through memory controllers (not shown). The microprocessor 100 may be directly connected to the block RAMs 90. By providing coupling between the microprocessor 100 and the block RAMs 90, the block RAMs 90 may be shared by the microprocessor 100 and the programmable logic fabric 12. Such direct sharing eliminates the need for programming the programmable logic fabric to provide the microprocessor with access to the RAMs 90.

The interface logic 94 may contain one or more blocks of logic gates. These blocks may be designed to perform any logic function, and may communicate in any manner with the microprocessor 100, the block RAMs 90, and the interconnecting tiles 96. In FIG. 10A, only one such block (114) of logic functions is shown. The interface logic 94 may also contain one or more blocks of configurable logic gates. These blocks may be configured to perform any logic function, and may communicate in any manner with the microprocessor 100, the block RAMs 90, and the interconnecting tiles 96. In FIG. 10A, only one such block (116) of configurable logic functions is shown. The interface logic 94 may further contain a test module 103 that controls the manufacturing testing of the microprocessor 100, interconnecting tiles 96, and/or various parts of the interfacing logic 94. In FIG. 10A, even though the test module 103 is shown as an isolated block to simplify the diagram, in reality it will be connected to some or all of the above mentioned components. A control module 105 can be used to control the operations of the microprocessor 100 and various components in the interfacing logic 94. The interface logic 94 may also contain a timing module 107 that generates various timing signals for the microprocessor 100 and other components in the interface logic 94. The timing module 107 may contain clock generation circuits (such as oscillators), or may use some of the clock signals of the programmable logic fabric. In FIG. 10A, even though the control module 105 and timing module 107 are shown as isolated blocks, they are in reality connected to some or all of the above mentioned components. In addition, modules performing other functions may also be included.

The microprocessor 100 may communicate directly with the interfacing tiles 96 (which are programmably connected to the CLBs 98 shown in FIG. 9). The microprocessor 100 may also communicate with the interfacing tiles 96 through the blocks of logic gates 114 and blocks of programmable logic gates 116. The connections shown in FIG. 10A could be unidirectional and/or bidirectional.

The block RAM 90 may store at least a portion of the executable instruction code for the microprocessor 100. In addition, such memory may store the data to be processed by the microprocessor 100 and the data already processed by the microprocessor 100. Because the memory is shared between the microprocessor 100 and the programmable logic fabric 12, configured portions of the programmable logic fabric 12 may retrieve the data to be processed and/or the data already processed to perform a certain function upon the data.

It should be noted that the block RAM 90 may be at any position relative to the microprocessor 100 (top, down, left or right).

Figure 10B:
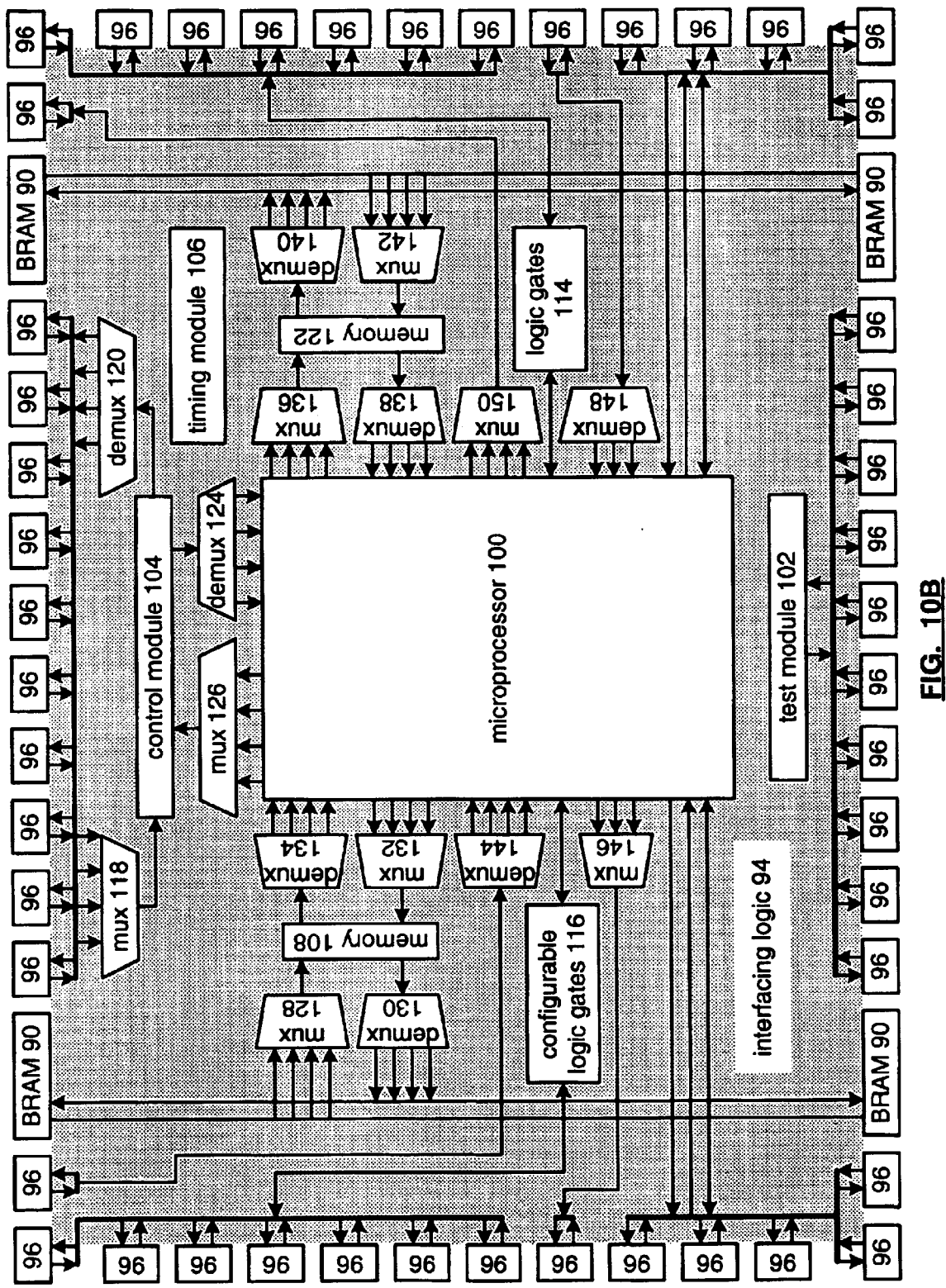
FIG. 10B illustrates a schematic block diagram of the interconnecting tiles and an embodiment of the interfacing logic in accordance with the present invention.

A specific implementation of an interface logic is shown in FIG. 10B. To efficiently input and output signals from microprocessor 100, which may include more than nine hundred input and/or output connections, the interfacing logic 94 includes a plurality of multiplexors 118, 128, 132, 136, 142, 146, and 150 and/or a plurality of demultiplexors 120, 130, 134, 138, 140, 144, and 148. The multiplexors 118, 128, 132, 136 142, 146, and 150 function to transmit two or more signals over a single path, to serialize parallel data, and/or to select one of multiple input signals. The demultiplexors 120, 130, 134, 138, 140, 144, and 148 function to separate multiple signals on one path into separate signals on multiple paths or to convert serial data into parallel data. It should be noted that multiplexors/demultiplexors may have inputs and outputs of multiple signal widths (i.e., the output of a multiplexor may have more than one signal and the input of a demultiplexer may have more than one signal).

As shown, demultiplexor 134 facilitates reading data and/or instructions from memory 108. Memory 108 may be single or multi port memory. For example, demultiplexor 134 receives a serial stream of data from memory 108 and provides it in parallel to an address bus interface, data bus interface, and/or an instruction bus interface of the microprocessor 100. Multiplexor 132 facilitates writing data to memory 108. In this example, multiplexor 132 receives parallel data from the microprocessor 100 and converts the parallel data into serial data for storing in memory 108. As one of average skill in the art will appreciate, the microprocessor 100 may also have one or more direct connections to memory 108 exclusive of the multiplexor 132 and demultiplexor 134 or in combination therewith. As one of average skill in the art will further appreciate, the microprocessor 100 may have more or less multiplexors and demultiplexors coupling it to memory 108.

Multiplexor 128 provides multiplexing of multiple signals from the BRAM 90 to the left of the microprocessor 100 into a single stream of data to memory 108. As such, data and/or instructions from the BRAM 90 may be delivered to the microprocessor 100. Demultiplexor 130 provides demultiplexing of a single stream of data from memory 108 in to a plurality of separate signals, which are coupled to BRAM 90. As such, the microprocessor 100 may write data to the BRAM 90 via memory 108. As one of average skill in the art will appreciate, multiplexor 128 may include direct coupling to the microprocessor 100, such that data being retrieved from BRAM 90 does not have to be intermediately stored in memory 108. As one of average skill in the art will further appreciate, demultiplexor 130 may be directly coupled to the microprocessor 100 such that data may be directly written to the BRAM 90. As one of average skill in the art will also appreciate, the microprocessor 100 may have a direct connection to the BRAM 90 or through a memory controller.

It should be noted that memory 108 may be connected to the microprocessor 100 without the use of multiplexor 132 and demultiplexor 134. It should also be noted that memory 108 may be of any width (generally up to the width of the microprocessor 100). Further, memory 108 may be used for storing instructions, data or a combination of both.

Multiplexors 136 and 142 and demultiplexors 138 and 140 provide the microprocessor 100 with similar access to memory 122 and the BRAM 90 on the right of the microprocessor 100 as multiplexors 128 and 132 and demultiplexors 130 and 134 provided the microprocessor 100 access to memory 108 and the BRAM 90 on the left. As one of average skill in the art will appreciate, the interconnecting logic 94 may include more are less memory than the memory shown (i.e., memory 108 and memory 122) and that such memory may be of any size to support the microprocessor. In addition, the memory 108 and 122 may be static RAM, dynamic RAM, and/or erasable programmable read only memory.

As further shown in FIG. 10B, Multiplexor 146 provides a direct connection between the microprocessor 100 and one of the plurality of interconnecting tiles 96 on the left side of the microprocessor 100. As coupled, multiplexor 146 receives parallel data and/or a plurality of signals from a plurality of pins of the microprocessor 100. Depending on the functionality of multiplexor 146, it can either select one of the plurality of signals to pass to the interconnecting tile 96 and/or multiplex the plurality of signals into a single signal. Multiplexor 150 provides similar connectivity between the microprocessor 100 and an interconnecting tile 96 on the right of the microprocessor. As one of average skill in the art will appreciate, the interconnecting logic 94 may include more or less multiplexors like multiplexor 146 and multiplexor 150 on any side of the microprocessor 100, depending on the desired connectivity to the microprocessor 100, the type of microprocessor 100, and/or the size of the microprocessor 100.

Demultiplexor 144 provides a direct connection between the microprocessor 100 and one of the plurality of interconnecting tiles 96 on the left side of the microprocessor 100. As coupled, demultiplexor 144 receives serial data and/or a plurality of multiplexed signals from at least one of the plurality of interconnecting tiles 96. Depending on the functionality of demultiplexor 144, it either converts the plurality of multiplexed signals into a plurality of signals carried on separate paths or converts the serial signal stream into parallel signals. Demultiplexor 148 provides similar connectivity between the microprocessor 100 and an interconnecting tile 96 on the right of the microprocessor. As one of average skill in the art will appreciate, the interconnecting logic 94 may include more or less demultiplexors like demultiplexor 144 and demultiplexor 148, depending on the desired connectivity to the microprocessor 100, the type of microprocessor 100, and/or the size of the microprocessor 100.

The interfacing logic 94 may further include direct connections between the microprocessor 100 and one or more of the interconnecting tiles 96. Such direct connections may be unidirectional communication paths for inputting signals into the microprocessor 100 or for outputting signals from the microprocessor 100. In addition, such direct connections may be bidirectional communication paths for inputting and outputting signals from the microprocessor 100. Such direct connections are shown coupled to the lower left and lower right portions of the microprocessor 100. As one of average skill in the art will appreciate, more or less direct connections may be provided between the interconnecting tiles 96 and the microprocessor 100 than those shown in FIG. 10B (from any side of the microprocessor 100).

The interfacing logic 94 may further include a test module 102. The test module 102 is selectively coupled to a plurality of interconnecting tiles 96 and to the plurality of circuits within the interfacing logic 94. (Such connections are not shown for clarity purposes.) In general, the test module 102 controls the manufacturing testing of the microprocessor, the interface logic and/or the surrounding programmable logic fabric.

The interfacing logic 94 may further include a control module 104, which is operably coupled to a plurality of multiplexors 118 and 126 and demultiplexors 124 and 120. The multiplexors 118 and 126 function to transmit two or more control signals over a single path, to serialize parallel control data, and/or to select one of multiple control signals. The demultiplexors 120 and 124 function to separate multiple control signals on one path in to separate control signals on multiple paths or to convert serial control signals into parallel control signals. Multiplexors 118 and 126 and demultiplexors 120 and 124 are operably coupled to a plurality of interconnecting tiles 96. As coupled, control signals can be inputted to the control module 104 or outputted from the control module 104 via the interconnecting tiles 96 to the programmable logic fabric and/or the IOBs 86 and between the control module 104 and the microprocessor 100. It should be noted that the control module 104 may have direct connections to the microprocessor 100 without any multiplexors/demultiplexors.

In this illustration, the control module 104 is operably coupled to the microprocessor 100, which is essentially a microprocessor core. In general, the control module 104 provides control signals that control the operations of the microprocessor 100 and receive related control information from the microprocessor 100. For example, the control module 104 may provide control functions for interrupts, clocks, resets, power management, instruction cache control, data cache control, direct memory access (DMA) control, RAM memory control, external peripheral bus control, UART control, and/or general purpose I/O control. Such control functions of a microprocessor are known, thus no further discussion will be presented except to enhance the understanding of the present invention.

The interfacing logic 94 may further include a timing module 106 that includes timing circuits. The timing circuits can perform such functions as generating 64-bit time-based timers, programmable interval timers, fixed interval timers, and watchdog timers. In addition, the timing module may provide clock signals to the configurable logic gates 116 and/or the logic gate 114 (shown in FIG. 10A) to latch data into and out of the circuits. Still further, the timing module 106 may provide the timing to latch data into and out of each of the multiplexors, demultiplexors, and interconnecting tiles 96. The timing module 106 may also obtain inputs (e.g. tick counter) from and send outputs to the interconnecting tiles 96. The functionality of timing circuits and debug modules used in conjunction with a microprocessor 100 is known, thus no further discussion will be presented except to further illustrate the concepts of the present invention. As mentioned in FIG. 10A, the timing module may be connected to all the components in the interfacing logic 94 and the microprocessor 100.

As one of average skill in the art will further appreciate, the interfacing logic 94 conditions signal transfers between the fixed logic device 32, in this example microprocessor 100, and the surrounding programmable logic fabric 12, which includes the CLBs 80, block RAM 90, and multipliers 92. Accordingly, the interfacing logic 94 can perform a variety of logical functions, including providing multiplexing of signals into and/or out of the microprocessor, performing logic functions upon input and/or output signals, storing the signals, and providing direct coupling between the programmable logic fabric and the microprocessor 100. In addition, the interfacing logic 94 includes testing functionality.

As one of average skill in the art will still further appreciate, the circuitry embodying the interfacing logic 94 of FIG. 10B represents one of an almost endless combination of circuits that could comprise the interfacing logic 94. As such, the interfacing logic 94 may include more or less circuitry than that depicted in FIG. 10B. For example, the interfacing logic 94 may further include analog to digital converters, digital to analog converters, analog filters, digital filters, arithmetic logic units, floating point units, interrupt controllers, memory controllers, and/or memory management blocks.

As one of average skill in the art will also further appreciate, while FIG. 10B illustrates a microprocessor 100 as the embedded fixed logic circuit, the same concept of interfacing logic 94 and a plurality of interconnecting tiles 96 applies for any fixed logic circuit. For example, the microprocessor 100 may be replaced with a digital signal processor, video graphics processor, audio processor, network processor, physical layer interface, link layer interface, and/or network layer interface. Depending on which type of fixed logic circuit is used, the interfacing logic 94 may include more or less circuitry than that shown in FIG. 10B, but its function is the same: condition signals transfers between the fixed logic circuit and the programmable logic fabric.

Figure 11:
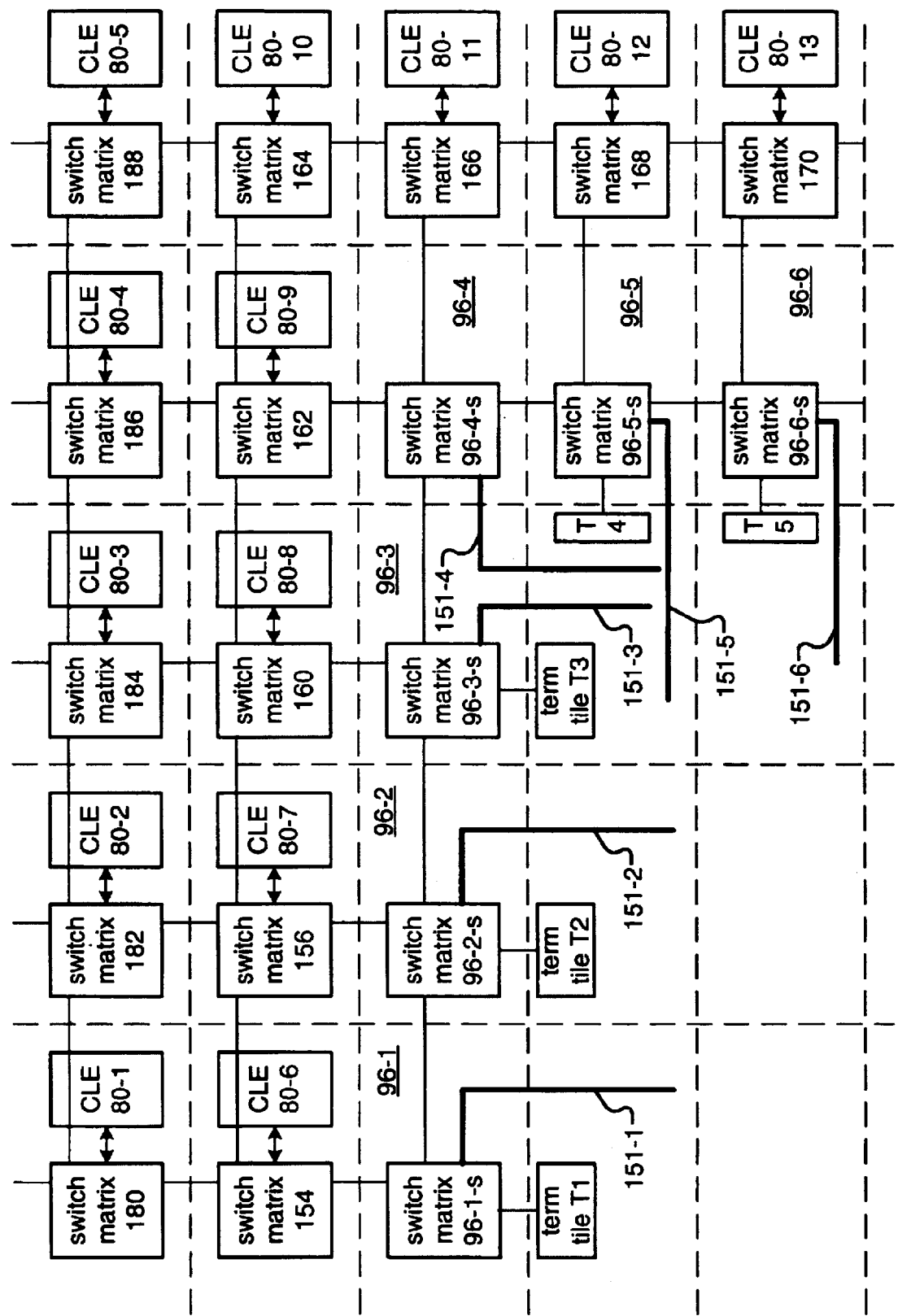
FIG. 11 illustrates a schematic block diagram of the interconnecting tiles interfacing with the programmable logic fabric in accordance with the present invention.

FIG. 11 illustrates a schematic block diagram of a few of the interconnecting tiles 96-1 through 96-6 operably coupling to the surrounding programmable logic fabric. The surrounding programmable logic fabric includes a plurality of configurable logic elements (CLE) 80-1 through 80-13 and corresponding programmable switch matrices 154 through 188. Solid lines between the programmable switch matrices represent various interconnect lines that provide connectivity in the programmable logic fabric. Dashed lines in FIG. 11 are provided to help visualization of the geometry. An example of a FPGA architecture that can be used in the present invention can be found in a U.S. patent (U.S. Pat. No. 5,914,616) entitled "FPGA Repeatable Interconnect Structure with Hierarchical Interconnect Lines."

Each interconnecting tile contains a programmable switch matrix that is programmably connected to (a) a programmable switch matrix in the programmable logic fabric, (b) a termination tile (called herein "term tile"), and (c) adjacent interconnecting tiles. FIG. 11 shows six matrices labeled 96-1-s to 96-6-s in the interconnecting tiles 96-1 to 96-6, respectively. As an example, the switch matrix 96-2-s is connected to the switch matrix 156 in the programmable logic fabric, a term tile T2, and adjacent interconnecting tiles 96-1-s and 96-3-s. Similarly, the switch matrix 96-5-s is connected to the switch matrix 168 in the programmable logic fabric, a term tile T4, and adjacent interconnecting tiles 96-4-s and 96-6-s. The six programmable switch matrices 96-1-s to 96-6-s each contains a plurality of connections (shown as lines 151-1 to 151-6, respectively) that are connected to the microprocessor 100 and/or components in the interfacing logic 94.

The structure of switch matrices 96-1-s to 96-6-s is substantially the same as that of the switch matrices in the programmable logic fabric.

The function of the term tiles is to terminate the interconnect lines and/or provide connectivity to the lines that are interrupted by the microprocessor 100 and/or components of the interfacing logic 94. In one embodiment (e.g., the FPGA described in the above mentioned U.S. Pat No. 5,914,616), the programmable logic fabric contains single, hex and long lines. In the term tiles, the single lines are U-turned to other singles, the hex lines are rebuffered and span to the far side of the microprocessor 100, and the long lines span the microprocessor 100.

Figure 12:
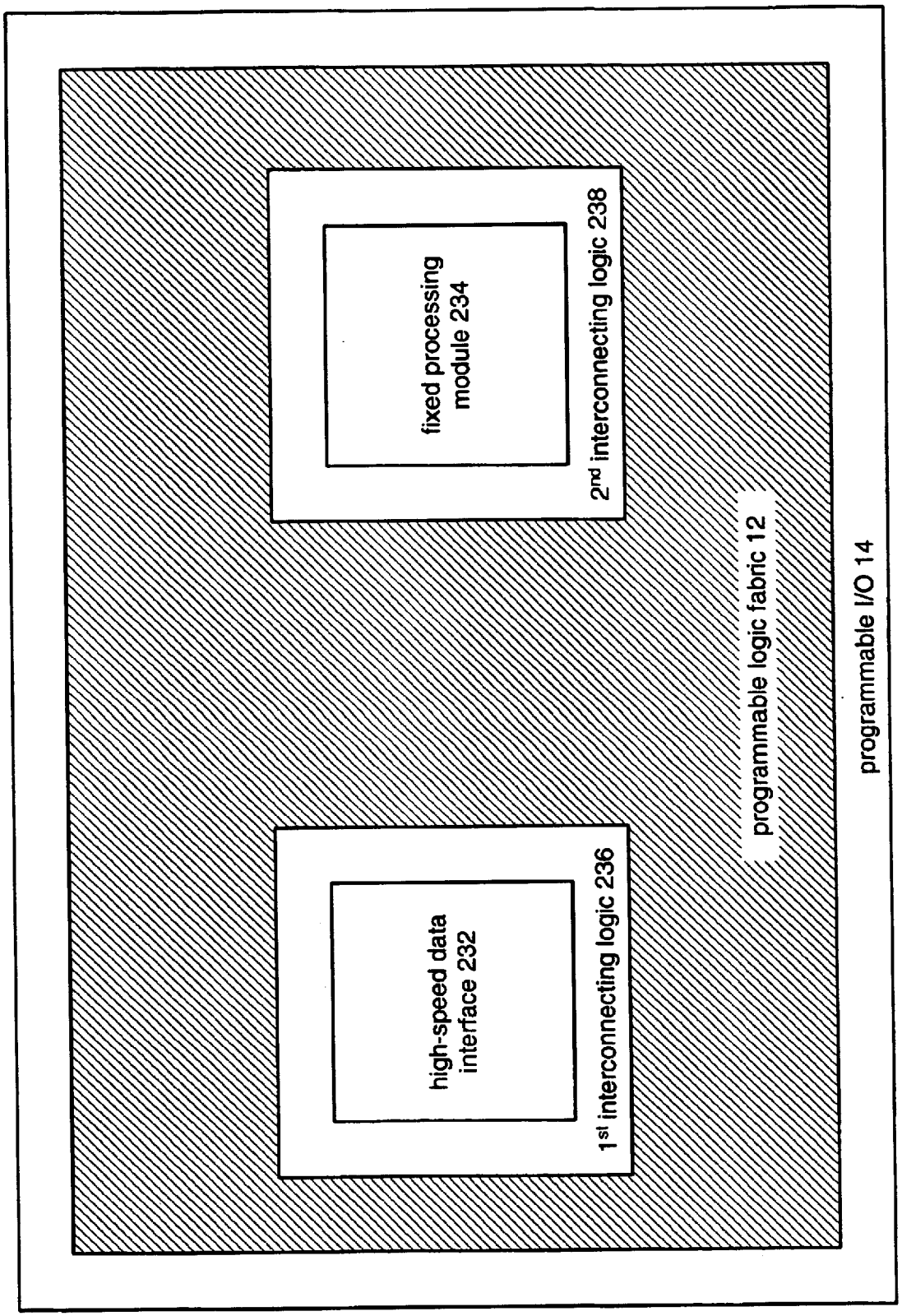
FIG. 12 illustrates a graphical diagram of yet another programmable gate array in accordance with the present invention.

FIG. 12 illustrates a schematic block diagram of an alternate programmable gate array 230. The programmable gate array 230 includes the programmable logic fabric 12, the programmable input/output blocks 14, a fixed processing module 234, $2^{nd}$ interconnecting logic 238, another fixed logic module (such as a high speed data interface 232) and $1^{st}$ interconnecting logic 236. The $1^{st}$ and $2^{nd}$ interconnecting logic 236 and 238 may include interfacing logic and interconnecting tiles as previously described. The high-speed data interface 232 may be a network layer interface, such as TCP/IP interface, a physical layer interface, such as Ethernet or asynchronous transfer mode (ATM) interface, or a link layer interface. The fixed processing module 234 may be a digital signal processor, network processor, microprocessor, and/or microcomputer, such that the programmable gate array provides a high-speed data interface, a fixed processor and programmable logic for a wide variety of telecommunication, networking, and/or computing applications.

Figure 13:
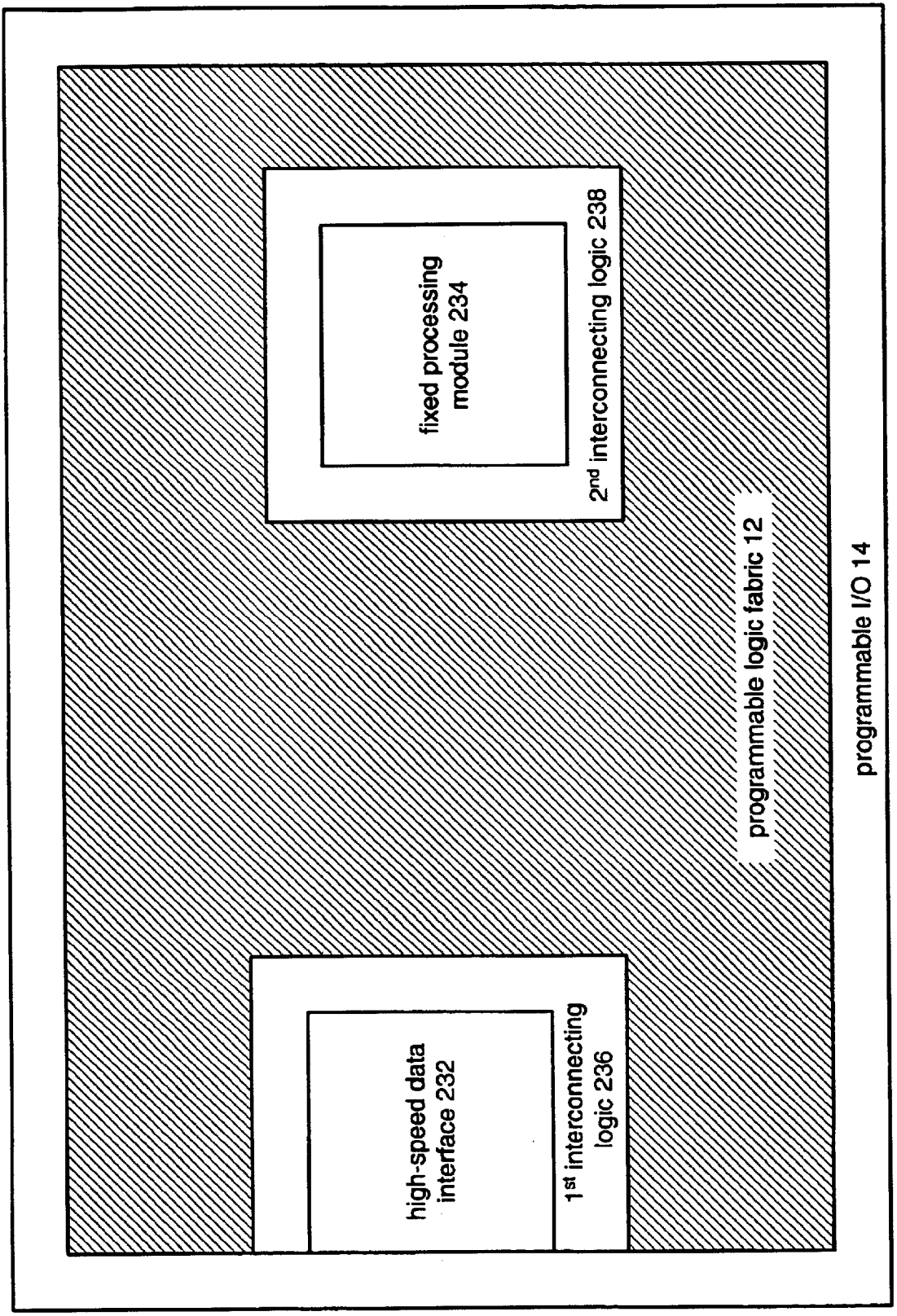
FIG. 13 illustrates a graphical diagram of a variation of the programmable gate array of FIG. 12.

FIG. 13 illustrates a variation of the gate array 230 of FIG. 12. In FIG. 13, the gate array 240 has the high-speed data interface 232 positioned adjacent to the programmable input/output blocks 14. As such, the high-speed data interface 232 directly couples to at least some of the programmable input/output blocks 14. In this configuration, the $1^{st}$ interconnecting logic 232 partially encircles the high-speed data interface 232.

Figure 14:
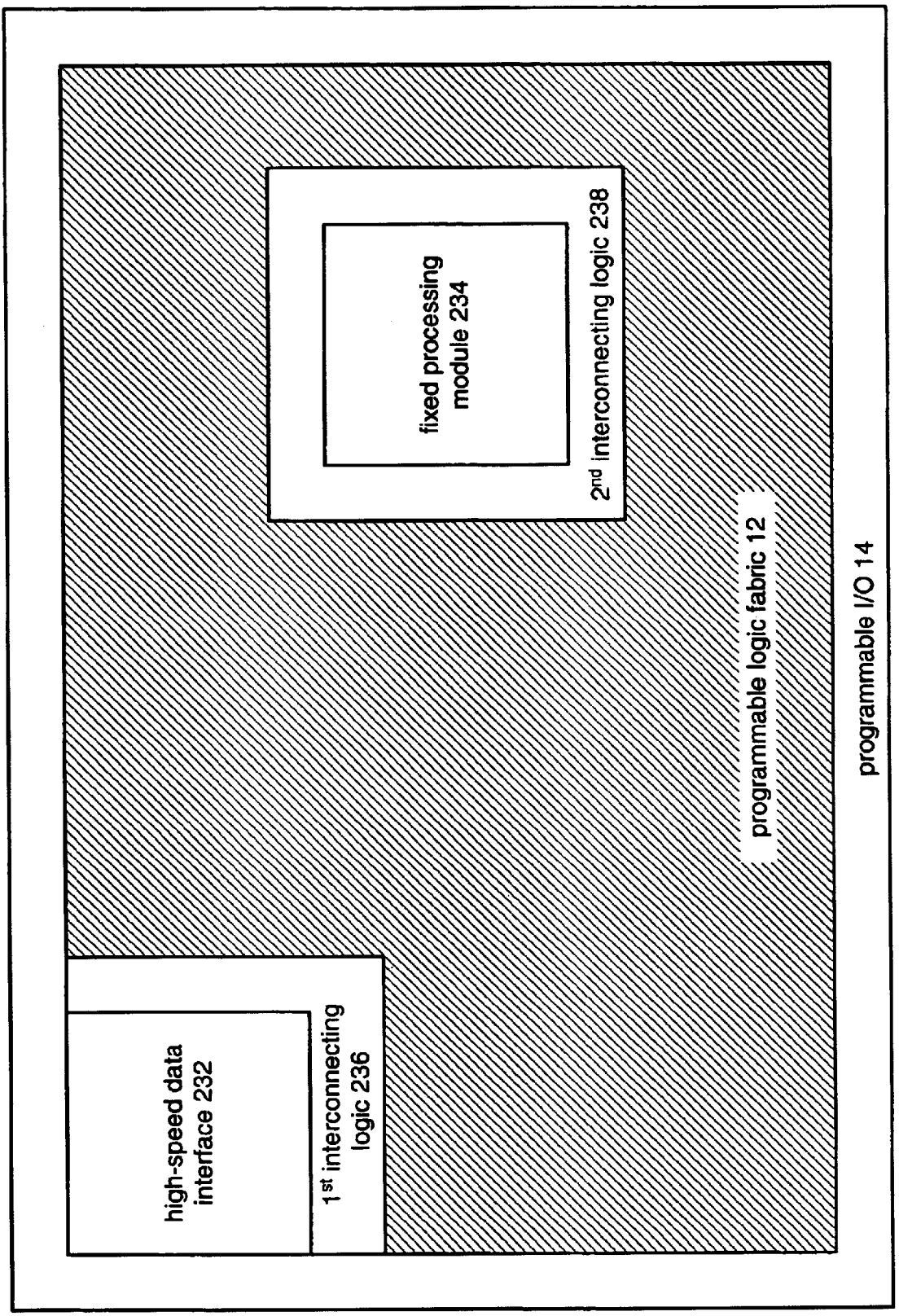
FIG. 14 illustrates a graphical diagram of a further variation of the programmable gate array of FIG. 12.

FIG. 14 illustrates a further variation of a programmable gate array 250 that includes a high-speed data interface 232 and a fixed processing module 234. In this embodiment, the high-speed data interface is positioned in a corner of the programmable gate array. As such, the high-speed data interface 232 has direct access on 2 sides to the programmable input/output blocks 14. As such, the $1^{st}$ interconnecting logic 236 interfaces with 2 sides of the high speed data interface.

From FIGS. 12–14, it should be clear to a person of average skill in the art that a programmable gate array may have any number and types of fixed logic modules positioned at various locations interacting with each other in two-sided, three-sided or four-sided configuration.

The preceding discussion has presented a programmable gate array that includes interconnecting logic such that any fixed logic circuit may be embedded within the programmable logic fabric. Accordingly, the applications and versatility of such a programmable gate array is dramatically enhanced via the use of the present invention. As one of average skill in the art will appreciate, other embodiments may be derived from the teaching of the present invention without deviating from the scope of the claims.

What is claimed is:

1. A programmable gate array comprising:
   programmable logic fabric comprising a plurality of components arranged in a regular pattern;
   a fixed logic circuit having at least one input and at least one output, wherein the fixed logic circuit is physically located within the programmable logic fabric, and wherein the fixed logic circuit is located where a portion of the regular pattern of the programmable logic fabric including a plurality of the components is displaced;
   interconnecting logic operable to couple the at least one input and the at least one output of the fixed logic circuit to the programmable logic fabric; and
   a physical interface between the programmable logic fabric and the fixed logic circuit, wherein the interconnecting logic is located along at least a portion of the physical interface.

2. The programmable gate array of claim 1, wherein the plurality of components comprises a plurality of programmable logic blocks.

3. The programmable gate array of claim 2, wherein the plurality of components further comprises at least one memory block.

4. The programmable gate array of claim 2, wherein the plurality of components further comprises at least one multiplier.

5. The programmable gate array of claim 1, wherein the fixed logic circuit further comprises at least one of a digital signal processor, a microprocessor, a physical layer interface, a link layer interface, a network layer interface, an audio processor, a video graphics processor, and an application specific integrated circuit.

6. The programmable gate array of claim 1 wherein the interconnecting logic further comprises:
a first switch matrix connected to the at least one input of the fixed logic circuit;
a second switch matrix connected to the at least one output of the fixed logic circuit;
a first term tile connected to the first switch matrix; and
a second term tile connected to the second switch matrix.

7. The programmable gate array of claim 6 wherein the first term tile comprises a first single line connected by a U-turn to a second single line.

8. The programmable gate array of claim 6 wherein the first term tile comprises a hex line which is rebuffered and which spans to a far side of the fixed logic circuit.

9. The programmable gate array of claim 6 wherein the first term tile comprises a long line which spans the fixed logic circuit.

10. The programmable gate array of claim 6, wherein the fixed logic circuit is a first fixed logic circuit, the portion of the regular pattern of the programmable logic fabric is a first portion of the regular pattern of the programmable logic fabric, and the interconnecting logic is a first interconnecting logic, further comprising:
a second fixed logic circuit having at least one input and at least one output, wherein the second fixed logic circuit is physically located within the programmable logic fabric and is located where a second portion of the regular pattern of the programmable logic fabric is displaced; and
second interconnecting logic operable to couple the at least one input and the at least one output of the second fixed logic circuit to the programmable logic fabric, the second interconnecting logic comprising a third switch matrix connected to the at least one input of the second fixed logic circuit, a fourth switch matrix connected to the at least one output of the second fixed logic circuit, a third term tile connected to the third switch matrix, and a fourth term tile connected to the fourth switch matrix.

11. The programmable gate array of claim 10, wherein the second fixed logic circuit further comprises at least one of a digital signal processor, a microprocessor, a physical layer interface, a link layer interface, a network layer interface, an audio processor, a video graphics processor, and an application specific integrated circuit.

12. The programmable gate array of claim 6 wherein the programmable logic fabric further comprises:
a third switch matrix coupled to the first switch matrix and a first configurable logic block; and
a fourth switch matrix coupled to the second switch matrix and a second configurable logic block.

13. The programmable gate array of claim 1 further comprising a plurality of input/output blocks arranged around a perimeter of the programmable logic fabric.

14. The programmable gate array of claim 1 wherein the interconnecting logic further comprises at least one of (a) a test module for testing at least one of the interconnecting logic and the fixed logic circuit, (b) a timing module, (c) a logic gate to perform a logic function upon at least one of the at least one input and the at least one output of the fixed logic circuit, and (d) a control module.

15. A programmable gate array comprising:
programmable logic fabric comprising a two-dimensional array of components;
a fixed logic circuit having at least one input and at least one output, wherein the fixed logic circuit is physically located within the programmable logic fabric, and wherein the fixed logic circuit is located where a portion of the programmable logic fabric including a plurality of the components extending in both dimensions of the two-dimensional array is displaced;
interconnecting logic operable to couple the at least one input and the at least one output of the fixed logic circuit to the programmable logic fabric; and
a physical interface between the programmable logic fabric and the fixed logic circuit, wherein the interconnecting logic is located along at least a portion of the physical interface.

16. A programmable gate array comprising:
programmable logic fabric comprising an array of programmable logic blocks and at least one column of memory blocks;
a fixed logic circuit having at least one input and at least one output, wherein the fixed logic circuit is physically located within the programmable logic fabric, and wherein the fixed logic circuit is located where a portion of the programmable logic fabric including a plurality of the programmable logic blocks is displaced;
interconnecting logic operable to couple the at least one input and the at least one output of the fixed logic circuit to the programmable logic fabric; and
a physical interface between the programmable logic fabric and the fixed logic circuit, wherein the interconnecting logic is located along at least a portion of the physical interface.

17. The programmable gate array of claim 16 wherein the portion of the programmable logic fabric further includes at least a portion of the at least one column of memory.

* * * * *